(12) United States Patent
Vachon

(10) Patent No.: US 10,488,552 B2
(45) Date of Patent: Nov. 26, 2019

(54) FLOW CONTROL DEVICE SIMULATION

(71) Applicant: CONOCOPHILLIPS COMPANY, Houston, TX (US)

(72) Inventor: Guy Vachon, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 903 days.

(21) Appl. No.: 14/562,299

(22) Filed: Dec. 5, 2014

(65) Prior Publication Data

US 2015/0161304 A1   Jun. 11, 2015

Related U.S. Application Data

(60) Provisional application No. 61/912,853, filed on Dec. 6, 2013.

(51) Int. Cl.
| | |
|---|---|
| *G01V 99/00* | (2009.01) |
| *E21B 41/00* | (2006.01) |
| *E21B 43/12* | (2006.01) |
| *E21B 43/24* | (2006.01) |

(52) U.S. Cl.
CPC ............ *G01V 99/005* (2013.01); *E21B 41/00* (2013.01); *E21B 43/12* (2013.01); *E21B 43/24* (2013.01)

(58) Field of Classification Search
CPC ...... B01D 29/908; B01D 35/02; B01D 35/30; B01D 29/92; C02F 1/004; C02F 2301/026; C02F 2103/42; E04H 4/1209
See application file for complete search history.

(56) References Cited

U.S. PATENT DOCUMENTS

| | | | |
|---|---|---|---|
| 5,407,172 A | 4/1995 | Young et al. | |
| 7,779,917 B2 | 8/2010 | Kotria et al. | |
| 8,033,335 B2 | 10/2011 | Orbell et al. | |
| 8,136,598 B2 | 3/2012 | Kotria et al. | |
| 8,413,716 B2 | 4/2013 | Judge et al. | |
| 8,469,107 B2* | 6/2013 | O'Malley | E21B 23/004 166/373 |
| 2011/0320047 A1* | 12/2011 | Stone | E21B 43/00 700/282 |
| 2012/0085543 A1 | 4/2012 | Redden et al. | |
| 2012/0197527 A1 | 8/2012 | McKay et al. | |
| 2012/0278053 A1* | 11/2012 | Garcia | E21B 43/12 703/10 |

(Continued)

OTHER PUBLICATIONS

Youngs, K. Neylon, J.A. Holmes, "Recent Advances in Modeling Well Inflow Control Devices in Reservoir Simulation", International Petroleum Technology Conference 13925 (2009).*

(Continued)

*Primary Examiner* — Rehana Perveen
*Assistant Examiner* — Steven W Crabb
(74) *Attorney, Agent, or Firm* — Boulware & Valoir

(57) ABSTRACT

Methods and systems simulate hydrocarbon production from a reservoir and predict impact of flow control devices on production for such reservoir simulation. The methods may transform equations capturing properties that describe flow of fluids through the flow control devices into input parameters desired for use with reservoir simulators. The equations may be determined based on physical properties of the flow control devices or fitted to match experimental or computational fluid dynamics data.

19 Claims, 3 Drawing Sheets

(56) References Cited

U.S. PATENT DOCUMENTS

2012/0318520 A1    12/2012  Lugo
2014/0216732 A1*   8/2014  Stone .................. E21B 43/2406
                                                                  166/250.15

OTHER PUBLICATIONS

"Flash evaporation of a single-component liquid" [retrieved on Jun. 29, 2017]. Retrieved from Internet Wayback Machine, URL:web.archive.org/web/20111105071358/https://en.wikipedia.org/wiki/Flash_evaporation (hereinafter referred to as "Flash Evaporation").*
Youngs, Bryony et al., "Multisegment well modeling optimizes inflow control devices," World Oil May 2010 issue, pp. 1-4 (2010) (Year: 2010).*
Coronado, Martin P. et al., "New Inflow Control Device Reduces Fluid Viscosity Sensitivity and Maintains Erosion Resistance," OTC 19811, Offshore Technology Conference May 2009, pp. 1-14 (2009) (Year: 2009).*
Wang, C., Quah, M., Noble, P. G., Shafer, R., Soofi, K. A., Alvord, C., & Brassfield, T. (Dec. 3, 2012). Use of Jack-up Drilling Units in Arctic Seas with Potential Ice Incursions during Open Water Season. Offshore Technology Conference. doi:10.4043/23745-MS.
International Search Report. PCT/US2014/043886, dated Nov. 3, 2014.

* cited by examiner

FLOW CONTROL DEVICE SIMULATION

CROSS-REFERENCE TO RELATED APPLICATIONS

This application is a non-provisional application which claims benefit under 35 USC § 119(e) to U.S. Provisional Application Ser. No. 61/912,853 filed Dec. 6, 2013, entitled "Flow Control Device Simulation," which is incorporated herein in its entirety.

STATEMENT REGARDING FEDERALLY SPONSORED RESEARCH

None.

FIELD OF THE INVENTION

Embodiments of the invention relate to reservoir simulation and techniques associated with predicting impact of flow control devices on production.

BACKGROUND OF THE INVENTION

Bitumen recovery from oil sands presents technical and economic challenges due to high viscosity of the bitumen at reservoir conditions. Thermal recovery processes such as steam assisted gravity drainage (SAGD) inject steam to heat the bitumen. The bitumen with reduced viscosity due to this heating then drains and is recovered.

One approach to facilitate the recovery utilizes flow control devices (FCDs), which are tools that regulate fluids passing into or out of wellbores by choking flow. The FCDs provide benefits with respect to steam conformance along the wellbores, cumulative production, steam-to-oil ratios and limiting steam production. Successful designing of completions employing the FCDs relies on understanding how the FCDs influence what happens in reservoirs.

However, prior reservoir simulators fail to account for behavior of the FCDs under operating conditions. Traditional tools to estimate $\Delta P$ assume it is a function of Reynold's number (Re, which impounds Flow rate, Viscosity and Density). Reservoir simulators rely on this assumption in their computations. This assumption does not hold when there are phase transitions in the fluids (as determined by lab tests conducted under these conditions). Flashing of the water within fluids passing through the FCDs further complicates describing performance of the FCDs. As a result, existing techniques lack ability to provide desired simulations when utilizing the FCDs in these thermal recovery processes.

Current models are inadequate to simulate the behavior of the standard FCDs under SAGD conditions. The current state of the art is thwarted by the lack of data on how FCDs behave at SAGD conditions. Using current techniques, each FCD is simulated as a separate wellbore and then impose constraints on bottom hole pressures, rates and steam-trap control. The behavior of the FCD is then forced in to the simulation by changing the well constraints. In the producer well the live steam entry is limited. In the injector well the bottom hole pressure and steam injection rate are limited.

Therefore, a need exists for methods and systems for reservoir simulation including applications with FCDs utilized in the thermal recovery processes. The gathering of laboratory data to characterize FCDs under SAGD representative conditions and a reservoir simulator capable of addressing the behavior of FCDs.

BRIEF SUMMARY OF THE DISCLOSURE

In one embodiment, a method of simulating hydrocarbon production from a reservoir includes determining a function for differential pressure through a well flow control device based on properties including flow rate, density, viscosity, steam quality, pressure and temperature of a fluid that includes both water and steam. The method includes transforming the function for differential pressure to an input parameter of a reservoir model. Simulating hydrocarbon production occurs with accounting for both the flow control device and the reservoir.

According to one embodiment, a method of simulating hydrocarbon production from a reservoir includes predicting a differential pressure of a fluid that includes both water and steam through stages separated by chokes of a well flow control device. Such predicting relies on $\Delta P$ estimation for flow through orifices in turbulent flow:

$$\Delta P = K \times \rho \times V^2 = K \times \frac{w^2}{\rho \times A^2} \qquad \text{Eq. 1}$$

Where:
  $\Delta P$ is the pressure drop across an orifice in psi
  K is a dimensionless friction factor which is a function of Re and will be determined empirically
  $\rho$ is the fluid's mass density in kg/m³
  V is the fluid's velocity in m/s
  w is the fluid's mass flow in kg/s
  A is the conduit's cross sectional area in m².

$$Re = \frac{d \times V \times \rho}{\mu} \qquad \text{Eq. 2}$$

Where
  d=internal diameter (mm)
  V is the fluid's velocity in m/s
  $\rho$ is the fluid's mass density in kg/m³
  $\mu$=dynamic viscosity in centipoises (cP)
  Formula to fit K to Re will be determined empirically but one approximation that has been used in mono-phase flow $$K = f_1 + \frac{f_1 + f_2}{\left(1 + \left(\frac{Re}{t}\right)^c\right)^d} \qquad \text{Eq. 3}$$

Where
  $f_1 = a_1 \times Re^{b_1}$
  $f_2 = a_2 \times Re^{b_2}$
  $a_1, a_2, b_1, b_2, c, d$ and $t$ are empirical factors based on flow testing For one embodiment, a system for simulating hydrocarbon production from a reservoir includes non-transitory computer-readable medium storing instructions that, when executed by a processor, cause the processor to perform operations. The operations include retrieving a function for differential pressure through a well flow control device based on properties including flow rate, density, viscosity, steam quality, pressure and temperature of a fluid that includes both water and steam and transforming the function for differential pressure to an input parameter of a reservoir model. Further, the operations include simulating hydrocarbon production with accounting for both the flow control device and the reservoir.

BRIEF DESCRIPTION OF THE DRAWINGS

A more complete understanding of the present invention and benefits thereof may be acquired by referring to the following description taken in conjunction with the accompanying drawings.

DETAILED DESCRIPTION

Figure 1:
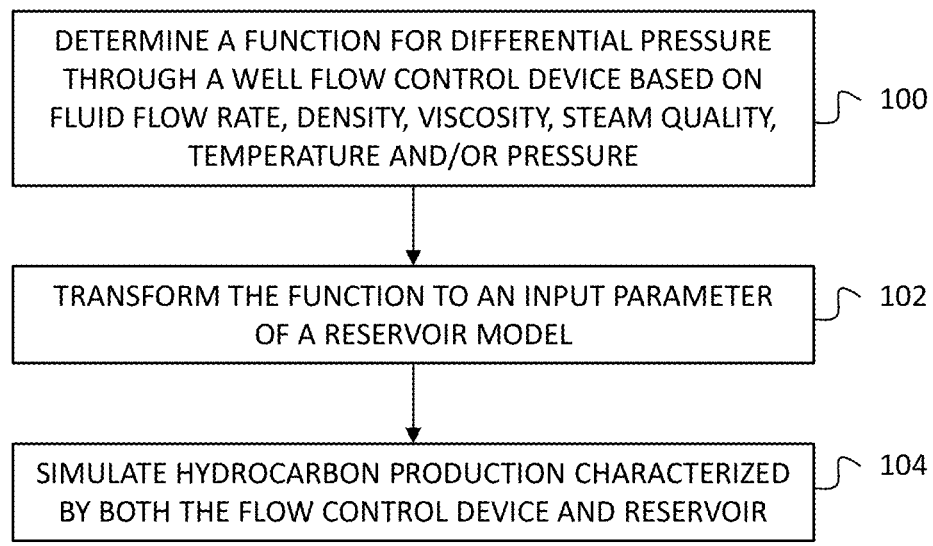
FIG. 1 is a flow diagram depicting a method of accounting for influences from a well flow control device in simulating hydrocarbon production from a reservoir, according to one embodiment of the invention.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

As used herein, flow control device "FCD" refers to all variants of tools intended to control flow into or out of wellbores by choking flow. The FCD includes both inflow control devices "ICDs" when used in producers and outflow control devices "OCDs" when used in injectors. The EQUALIZER FCD from Baker Hughes provides one example of an FCD.

Steam assisted gravity drainage (SAGD) provides an exemplary application of the FCD. In the SAGD, a horizontal injector well may traverse through the reservoir above and parallel to a horizontal producer well such that hydrocarbons drain to the producer well as steam is introduced through the injector well. The producer and/or the injector may include any number of the FCD to achieve desired performance. Optimization of completions utilizing the FCD may improve economics of the SAGD and relies on simulating recovery from the reservoir.

Embodiments of the invention relate to methods and systems that simulate hydrocarbon production from a reservoir and predict impact of the FCD on production for such reservoir simulation. The methods may transform equations capturing properties that describe flow of fluids through the FCD into input parameters desired for use with reservoir models. The equations may be determined based on physical properties of the FCD or fitted to match field, experimental or computational fluid dynamics (CFD) data.

The reservoir simulation relies on integrated wellbore hydraulics and reservoir models, such as STARS-FLEX-WELL from Computer Modeling Group, ECLIPSE software with Segmented Well from Schlumberger, NEXUS with SURFNET software from Halliburton, PROSPER with REVEAL software from Petroleum Experts or other commercially available reservoir models. The reservoir models require a description of the behavior of the FCD in the operating conditions. However, understanding the behavior of the FCD and how to account for such behavior becomes limited when the subcool (i.e., difference between injected steam and the produced fluids) approaches zero and the water in the reservoir begins to flash in the producer.

One aspect of understanding such behavior of the FCD in operation includes knowing a differential pressure resulting across the FCD from a reservoir side of the FCD to inside of the well. The fluids passing through the FCD may include water, oil, other matter or mixtures thereof and have both liquid and vapor phases of such constituents. Measurements or predictions of differential pressure across the FCD depend on various inlet steam qualities, flow rates, densities and viscosities at different pressures and temperatures of the fluids passing through the FCD. While these properties thus describe the performance of the FCD, the reservoir model cannot consume the properties and characterize the FCD directly.

In some embodiments, an experimental protocol determines the differential pressure across the FCD and may be based on lab experiments, field data or CFD analyses. Constructing or training a mathematical model or series of equations enables determining the differential pressure as a function of properties that include the flow rate, density, viscosity, steam quality, pressure and temperature for the fluid that includes both water and steam. This FCD model derives from results of the experimental protocol to then predict the differential pressure and may be based on physics, approximations or interpolations. For some embodiments, measuring properties under different conditions in a test flow path having the FCD disposed aboveground provides data for determining the FCD model. Since the steam quality is a function of the pressure and temperature, all three attributes may be known and considered included in the function without independent sensing for each. The FCD model may apply to all conditions the reservoir model may have to evaluate and may be implemented in software.

The FCD model also enables transforming the function for differential pressure to an input parameter of the reservoir model. For example, the reservoir model rather than taking aforementioned properties to account for the FCD may take an equation based on assumed physics, a curve fit or a table that holds the differential pressure across the FCD for the different flow conditions described by the parameters that the reservoir model estimates in describing flow in the formation. The reservoir model may utilize the equation that provides the input parameter and is based on a different set of attributes, such as a gas-to-liquid ratio or a hydrocarbon-to-water ratio, than the parameters upon which the function is based. For some embodiments, the transforming of the function may provide multiple different input parameters for a single reservoir model or multiple different reservoir models.

FIG. 1 illustrates a flow diagram of a method as described herein of accounting for influences from a well FCD in simulating hydrocarbon production from a reservoir. A FCD model equation construction step 100 determines a function for differential pressure through the well FCD based on fluid flow rate, density, viscosity, steam quality, pressure and temperature. In a tool data plugin step 102, a transformation of the function provides an input parameter of the reservoir model. Simulation of the hydrocarbon production then occurs in an output step 104.

Figure 2:
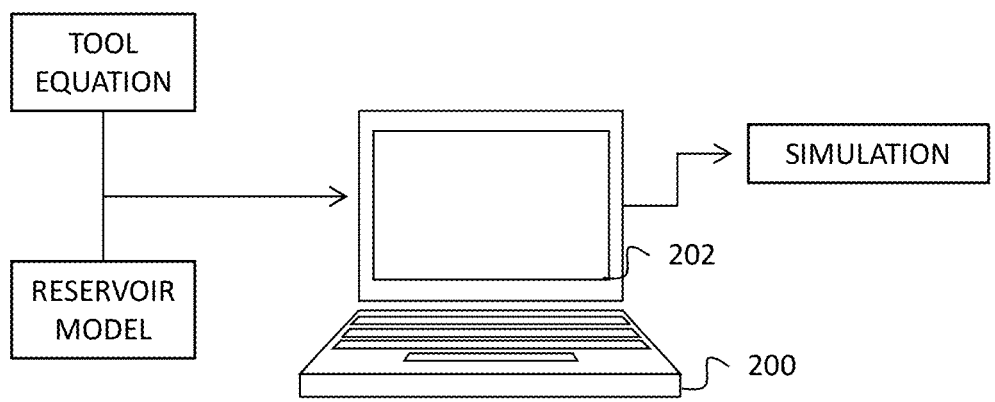
FIG. 2 is a schematic illustrating implementation of the method utilizing a system, according to one embodiment of the invention.

FIG. 2 shows a schematic illustrating implementation of the method utilizing a system. By way of example, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes RAM, ROM, erasable programmable ROM "EPROM", electrically erasable programmable ROM "EEPROM", flash memory or other solid state memory technology, CD-ROM, digital versatile disks "DVD", or other optical storage, magnetic cassettes, magnetic tape, magnetic disk storage or other magnetic storage devices, or any other medium which can be used to store the desired information and which can be accessed by a computer 200.

A user interface device 202 may include one or more devices with which a user accesses the computer 200. The user interface device 202 may include one or more input devices, such as a keyboard, a mouse and an electronic stylus. Further, the user interface device 202 may include one or more output devices, such as a display screen and a printer. In an exemplary operation, the computer 200 may perform operations as described herein for reservoir simulation utilizing a tool equation and a reservoir model as inputs and may provide a simulation result output on the user interface device 202.

Example 1

Simple FCD Model

By way of example, the FCD model may include a polynomial equation, an exponential equation, a logarithmic equation, a ratio of polynomials or a combination thereof. Such tool equations used for the FCD model would be fit to minimize a measure of error such as mean square error, median error or maximum error on a measured data set or results of a CFD simulation or a history match on a known well. The FCD model may further describe the physics of the flow through the FCD. For example, the FCD model may include use of a Bernoulli equation to predict the differential pressure, such as the following:

$$\Delta P = K \rho v^2, \qquad \text{Eq. 4}$$

where $\Delta P$ is the differential pressure, $\rho$ is the density of the fluid, v is the velocity of the fluid and K is a function Reynolds number (Re), which depends on velocity, density and viscosity of the fluid and specific properties of the FCD, which may differ for various designs of the FCD.

Value for the K can be modeled using a polynomial equation, an exponential equation, a logarithmic equation or a ratio of polynomials. While the steam quality aspect of the value for the K can also be fit to the behavior that matches performance of the FCD, an exemplary fit describes the physics of the FCD having a particular design and without being a function of the steam quality, as set forth by:

$$K = fn(Re), \text{ e.g.,}$$

$$K = f1 + (f1 + f2)/(1 + (Re/t)^c)^d, \qquad \text{Eq. 5}$$

where $f1 = a1 * Re^{b1}$, $f2 = a2 * Re^{b2}$ and a1, a2, b1, b2, c, d and t are empirical factors based on flow testing of the FCD. Therefore, the K may include fitting to include the steam quality, as represented by:

$$K = fn(Re, \text{ steam fraction}), \text{ e.g.,}$$

$$K = (f1 + (f1 + f2)/(1 + (Re/t)^c)^d) + x, \qquad \text{Eq. 6}$$

where x is a scaled value depending on the steam quality and may be represented as a constant or another equation that provides a best answer corresponding to known data as set forth herein.

The Eq. 4, using Eq. 6 for K, enables determination of the differential pressure that may be transformed to the input parameter desired for use with the reservoir model to capture the properties that describe the flow of fluids through both the formation and the completion including the FCD. The flow rate, density, viscosity, steam quality, pressure and temperature thereby get converted into terms acceptable to describe flow through the FCD for the reservoir model. The reservoir model then outputs simulations as normal.

In some embodiments, the FCD model estimates the differential pressure resulting from the fluid passing through stages separated by chokes of the FCD. Flashing of the fluid into steam causes the volume of the fluid to increase, which increases the velocity through the FCD and thus generates incremental differential pressure. In order to account for this effect, the FCD model describes a series of the chokes separated by gaps. In the gap, the pressure decreases by the differential pressure of the choke. If the fluid is at saturation after the pressure drop of the choke, some of the fluid flashes.

Based on the foregoing, this estimation may start with a Bernoulli equation, such as Equations 1 and 2, to get the differential pressure through a first choke. Since Equations 1 and 2 lack an accounting for effect of steam flashing through the FCD, the K of the Bernoulli equation may be scaled by another equation that then estimates a fraction by mass that flashes, as set forth by:

$$(H_{Li} - H_{Lo})/(H_{Vo} - H_{Lo}), \qquad \text{Eq. 7}$$

where $H_{Li}$ is liquid enthalpy at an inlet pressure entering the choke, $H_{Lo}$ is liquid enthalpy at an outlet pressure exiting the choke and $H_{Vo}$ is vapor enthalpy at the outlet pressure. As the vapor fraction increases, the density decreases, the viscosity changes and the fluid velocity increases. These effects can all be estimated to yield the fluid properties going into a second choke.

Calculations based on Equations 4, 5 and 6 may then be repeated n number of times to account for second and subsequent chokes and gaps. The steam fraction from previous stages combines with additional steam released at a current stage, as represented by:

$$S1 \text{ to } n-1 + (HLi - HLo)/(HVo - HLo), \qquad \text{Eq. 8}$$

where $S_{1 \text{ to } n-1}$ is a summation of the steam fraction produced in previous stages as calculated for each stage. Value of n for the number of times to be repeated and the properties of each choke can be determined based on physical properties of the FCD, be fitted to match data from a laboratory or field test or come from other means of determining FCD performance, such as CFD analysis. For some embodiments, the FCD includes at least three of the stages and the FCD model uses a calculation through only two (i.e., n=2) of the stages such that the value of n may be less than, greater than and/or not equal to the number of the chokes in the FCD.

In one example, the FCD model converged with laboratory data when n was two even though the number of stages in the FCD was greater than two. Further iterations with n greater than two failed to provide the best result. However, convergence occurred as expected when n was the actual number of stages if not accounting for influence of the fluid flashing to the steam and thus not employing Equation 4 in the estimation of the differential pressure in the foregoing description.

As described above, the fluid properties adjusted between the chokes accounts for the fluid that is flashed into steam after each choke. This approach includes a drawback in that a single choke seems to be insensitive to the fluid flashing across, which is not correct given the flashing occurs at each step. In order to correct this, the FCD model may further include a scaling factor to the computed amount of liquid that is expected to flash on each stage, as exemplified by:

$$((HLi-HLo)/(HVo-HLo))*C,\qquad \text{Eq. 9}$$

where C is the scaling factor for the amount of the steam that is released between the stages.

For embodiments where the fluid includes a mixture of oil, gas, water and steam, the FCD model may treat the fluid as an immutable stream with oil and gas moving in parallel with water and steam. The water and steam may change phase at the stages of the FCD with such phase changes accounted for by the FCD model as set forth herein. Treatment of the fluid in this manner enables the FCD model to provide that the oil and gas stay unchanged at each stage of the FCD.

Example 2

Detailed FCD Model

In order to accommodate the effects of phase transitions, it may be possible to estimate the performance of the FCD as a cascade of orifices applying enthalpy steam flash calculations in the spaces between orifices. For each orifice one can use a flow resistance (K) term appropriate for the expected flow regime with a non-Darcy (flow rate squared) term. The computation has been done for water without using the reservoir simulator and was verified experimentally. On emulsions there should be an inert component, the bitumen, and a separate water component so again a proper K term should be identified.

The change in pressure may cause some amount of water to flash to vapor if it causes the fluid to cross the liquid to gas transition of the fluid's transition diagram. The mass fraction that will be converted to vapor may be calculated:

$$\frac{h_{f@higherP} - h_{f@lowerP}}{h_{fg@lowerP}}\qquad \text{Eq. 10}$$

Where:
$h_{f@higherP}$=specific enthalpy of the fluid at the higher pressure in kJ/kg
$h_{f@lowerP}$=specific enthalpy of the fluid at the lower pressure in kJ/kg
$h_{fg@lowerP}$=latent heat of evaporation of the fluid at the lower pressure in kJ/kg The volume of fluid will increase as the vapor phase occupies more volume than the liquid phase which will in turn cause the velocity of the fluid to increase as the greater volume will need to pass through the same area in the next slot. This change would be taken into account in the ΔP computation of the succeeding slot and so on.

Figure 3:
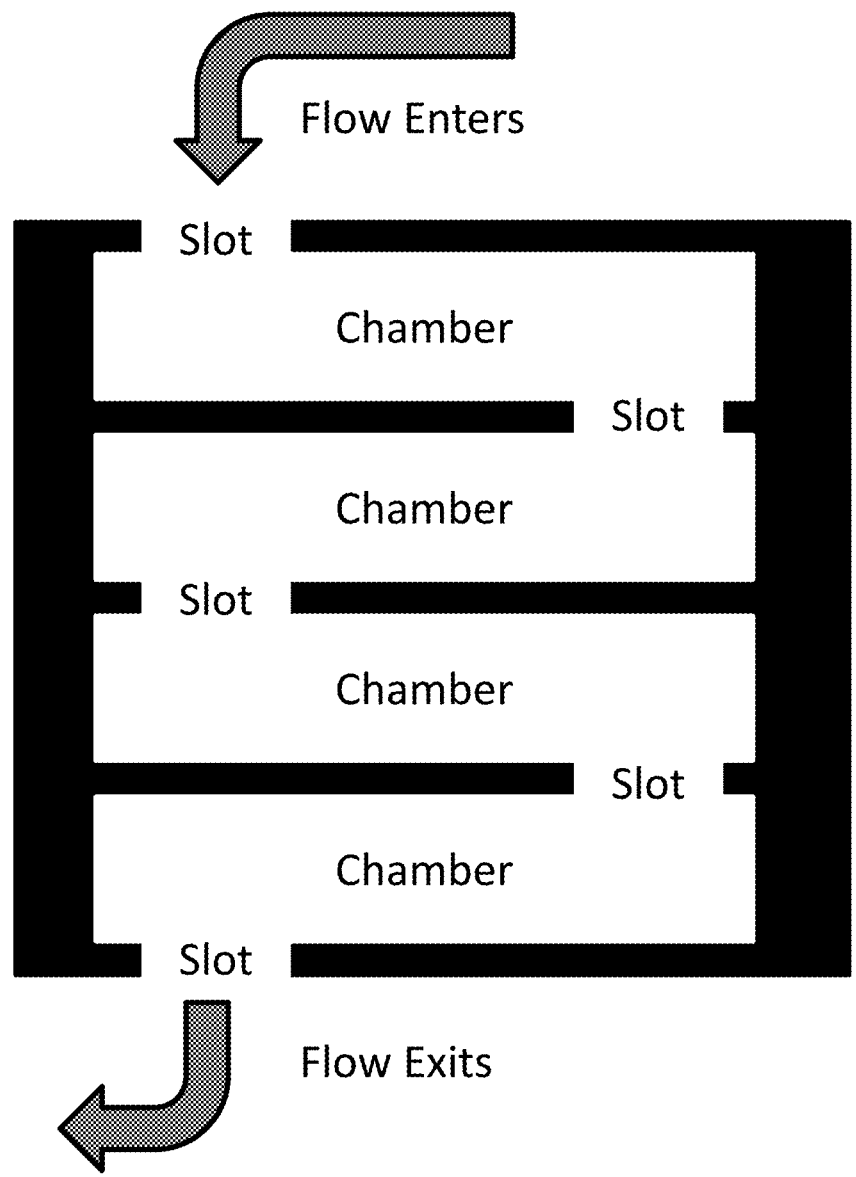
FIG. 3 is a schematic illustration of modeling FCDs as a series of slots followed by chambers.

FIG. 3, demonstrates the concept for modeling FCDs is to treat the model as a series of slots followed by chambers. The ΔP of each slot is estimated as previously discussed. The total ΔP for the device would be:

$$\Delta P_{total} = \Delta P_{slot\ 1} + \Delta P_{chamber\ 1} + \Delta P_{slot\ 2} + \Delta P_{chamber\ 2} + \ldots + \Delta P_{slot\ n} + \Delta P_{chamber\ n}\qquad \text{Eq. 11}$$

The chambers are where one would account for the flashing. It is unclear if the chambers will contribute much ΔP on their own so it is assumed they are frictionless and will not. The same equations would apply as for the slot albeit with a different K and A. If their area is significantly larger, the $A^2$ in the denominator by itself may render the contribution negligible. By leaving the number of stages n variable, it will be adequate to estimate ΔP, then factor in the effects of flashing and iterate n times.

Example 3

Refinement of Successive Orifices Flash Computations

Modeling the FCD as a series of chokes separated by frictionless chambers with the fluid properties adjusted between slots to account for the steam that is flashed at each step is known to be an oversimplification. For example, a single choke would seem to be insensitive to steam flashing across it which is known not to be correct. There is steam flashed at each step of the process. It is also known that the chambers between slots are not frictionless and that the torturous nature of the path creates turbulence and other effects that influence the resulting ΔP and thus the amount of flashing.

The water mass fraction that is converted to steam at each intermediate stage of the multi-slot model of the FCD was initially estimated using Equation 10. A factor Sk is introduced to compensate for other effects resulting in the following:

$$\frac{(h_{f@higherP} - h_{f@lowerP}) \times Sk}{h_{fg@lowerP}}\qquad \text{Eq. 12}$$

Where:
$h_{f@higherP}$=specific enthalpy of the fluid at the higher pressure in kJ/kg
$h_{f@lowerP}$=specific enthalpy of the fluid at the lower pressure in kJ/kg
$h_{fg@lowerP}$=latent heat of evaporation of the fluid at the lower pressure in kJ/kg
Sk=a dimensionless scaling factor to the steam fraction
Sk is intended to summarize many factors so is not related to any one physical phenomenon in particular. It is adjusted in the process of training the model.

Example 3

Steam Quality

The first that was build uses an arbitrary series of slots followed by frictionless chambers. When the vapor fraction increases, the density decreases, the viscosity changes and the fluid velocity increases. These effects can all be estimated to yield the fluid properties going into a second choke. The process is repeated an arbitrary number of times. The number of times and the properties of each choke can be determined based on physical properties of the FCD or they can be fitted to match data from a laboratory or field test, or from other means of determining tool performance.

The first implementation assumed all the chokes in series behave the same. An alternate implementation can take in a different description for each choke. Yet another alternate implementation can address steam differently. It can scale the value of K depending on the steam fraction. In other words, instead of making k a function of Re, it makes it a arbitrary function of Re and Vapor Fraction that can be fit to the behavior that matches the FCD performance.

In this model the fluid can be water, oil, or any other fluid or mix thereof. The vapor is the gaseous phase of such fluids.

The steam fraction at each intermediate stage of the multi-slot model of the FCD was initially estimated using the following thermodynamic equation:

(StageEnthalpyIn−StageEnthalpyOut)/(StageSteamEnthalpyOut−StageEnthalpyOut)

in the refined model it is:

(StageEnthalpyIn−StageEnthalpyOut)/(StageSteamEnthalpyOut−StageEnthalpyOut)*$K$ where K is the scaling factor for the amount of steam that is released between the stages.

A tuning parameter scales the amount of steam liberated when pressure drops across the FCD. The steam increase becomes:

$Sk$*(StageEnthalpyIn−StageEnthalpyOut)/(StageSteamEnthalpyOut−StageEnthalpyOut)

Sk was taken to be a constant. This works adequately for low steam fraction but fails as the steam fraction increases. Sk was made a function of the Steam Fraction and two parameters were used to tune it, $S_{k1}$ and $S_{k0}$. $S_{k1}$ is a number between 0 and 1 and $S_{k0}$ is a positive number:

If SteamFraction<$S_{k1}$ Then $Sk = (1-(\text{SteamFraction}/Sk1))^{Sk0} + ((\text{SteamFraction}/Sk1)^{Sk0})*(1-Sk1)$ Else $Sk = (1-Sk1)*(((1-\text{SteamFraction})/(1-Sk1))^{Sk0})$ Steam quality may then be calculated using the following estimate:

For $SQ<0$, $C=0$

For $SQ<S_{k1}$, $C = SQ/S_{k1} \cdot S_{k1} + (1-S_{k1})$ for $S_{k1}=1$, $C=0$ For $S_{k1} \neq 1$, $C = (SQ-S_{k1})/(1-S_{k1}) \cdot (1-S_{k1})$ Where SQ is Steam Quality $S_{k1}$ is steam fraction parameter 1 between 0 and 1, and Sk0 is steam fraction parameter 2 greater than zero.

Example 4

Black Box Model

The multi-slot refinement was intended to more closely model the physics of the FCD. As noted above, some deviations were expected due to some of the simplifying assumptions that were made. The model is trained on the data in order to minimize the prediction error but the closer a model matches the physics, the better the model should work. The Select FCD has 9 chambers so it was thought that 9 successive flash computations would best fit the data (n=9). The best results were obtained by using only 2 steps of flash computation (n=2). While unexpected, the result is welcome. It furthers the goal to model FCDs as black boxes independent of internal architecture. The final model developed used the following parameters:

| n | 2 | a1 | 0.007118704 | c | 1.405507151 |
|---|---|---|---|---|---|
| Sk | 0.616898904 | a2 | 1.278922809 | d | 0.05449507 |
| d | 3.712335032 | b1 | 0.238248119 | t | 3.60271E−06 |
|   |   | b2 | 0.000186341 |   |   |

The resulting performance had a median error of 0.47 psi and a maximum error of 4.35 psi on 34.63 psi or 13%. The median error is close to the loop measurement error so the results are deemed very good. The model next needs to be enhanced to address water cuts other than 0% or 100% as it is not yet proven with emulsions.

Example 5

Implementation

In one embodiment, the model is built as an Excel VBA application. There are routines to implement the various equations. They are used as native operations in Excel spreadsheets which are used as databases to hold the measurements and as data manipulation tools. The data from the tests, both the parameters and the results, are stored in columns with each row representing a different datapoint. The parameters to a model are also stored in cells in a spreadsheet so the model can be configured without changing the underlying VBA code.

One of the benefits of storing the model parameters as cells in a spreadsheet is that Excel Solver functionality can be used to optimize the model. Solver is set to minimize error by changing all the relevant model parameters. The error that is minimized can be the mean square error, the median error or the maximum error. The model is highly non-linear so Solver settles on local solutions. Better solutions require disturbing the model. This can be done by varying some parameters, and letting Solver resolve while optimizing some parameters and keeping others constant or alternating error criteria.

In order to support SAGD well design one must have the ability to simulate the performance of the completion. This implies addressing 2 different challenges:

Predict the ΔP through an FCD given the fluid properties and flow rate

Simulate the impact of the FCD on the reservoir which implies modeling both the wellbore hydraulics and the movement of fluids through the reservoir In another embodiment, reservoir simulation of thermal applications is conducted using STARS with FLEXWELL to address not only the reservoir but also the hydraulics in the wellbore. Using STARS+FLEXWELL and the appropriate FCD ΔP models, it provides a unique and powerful method to accurately model FCD behavior during a thermal recovery process.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

ALTHOUGH THE SYSTEMS AND PROCESSES DESCRIBED HEREIN HAVE BEEN DESCRIBED IN DETAIL, IT SHOULD BE UNDERSTOOD THAT VARI-

OUS CHANGES, SUBSTITUTIONS, AND ALTERATIONS CAN BE MADE WITHOUT DEPARTING FROM THE SPIRIT AND SCOPE OF THE INVENTION AS DEFINED BY THE FOLLOWING CLAIMS. THOSE SKILLED IN THE ART MAY BE ABLE TO STUDY THE PREFERRED EMBODIMENTS AND IDENTIFY OTHER WAYS TO PRACTICE THE INVENTION THAT ARE NOT EXACTLY AS DESCRIBED HEREIN. IT IS THE INTENT OF THE INVENTORS THAT VARIATIONS AND EQUIVALENTS OF THE INVENTION ARE WITHIN THE SCOPE OF THE CLAIMS, WHILE THE DESCRIPTION, ABSTRACT AND DRAWINGS ARE NOT TO BE USED TO LIMIT THE SCOPE OF THE INVENTION. THE INVENTION IS SPECIFICALLY INTENDED TO BE AS BROAD AS THE CLAIMS BELOW AND THEIR EQUIVALENTS.

The invention claimed is:

1. A method of improving steam assisted gravity drainage (SAGD) in a reservoir, comprising:
   a) determining a function for differential pressure through a well flow control device based on properties including flow rate, density, viscosity, steam quality, pressure and temperature of a fluid that includes both water and steam, wherein said well flow control device is modeled as a series of chokes separated by chambers, wherein pressure drop calculations are applied to said chokes and enthalpy steam flash calculations are applied to said chambers;
   b) transforming the function for differential pressure to an input parameter of a reservoir model of a reservoir;
   c) simulating hydrocarbon production in said reservoir model while accounting for both the flow control device and the reservoir; and
   d) optimizing a SAGD completion in said reservoir based on said simulated hydrocarbon production from step c), thereby improving SAGD in said reservoir.

2. The method according to claim 1, wherein the transforming includes using the function to provide multiple different input parameters for multiple different reservoir models.

3. The method according to claim 1, wherein the determining of the function includes fitting the function to data from one of field results from the flow control device in a production operation, measurements under different conditions in a test flow path having the flow control device disposed aboveground and performing computational fluid dynamic calculations.

4. The method according to claim 1, wherein the transforming of the function includes generating one of an equation based on attributes different from the properties and a curve that corresponds to behavior of the flow control device and is used for the input parameter of the reservoir model.

5. The method according to claim 1, wherein the transforming of the function includes generating entries for a table that correspond to behavior of the flow control device and are used for the input parameter of the reservoir model.

6. The method according to claim 1, wherein the function estimates flashing of the fluid into the steam while passing through said chambers based on the following mass fraction being converted to vapor:

$$(H_{Li}-H_{Lo})/(H_{Vo}-H_{Lo}),$$

where $H_{Li}$ is liquid enthalpy at pressure going in the choke, $H_{Lo}$ is liquid enthalpy at pressure out of the choke and $H_{Vo}$ is vapor enthalpy at pressure out of the choke.

7. The method according to claim 1, wherein the function estimates the differential pressure across more than two chambers based on a calculation through only two chambers stages using a pressure equation and with the following mass fraction being converted to vapor:

$$(H_{Li}-H_{Lo})/(H_{Vo}-H_{Lo}),$$

where $H_{Li}$ is liquid enthalpy at pressure going in the choke, $H_{Lo}$ is liquid enthalpy at pressure out of the choke and $H_{Vo}$ is vapor enthalpy at pressure out of the choke.

8. The method according to claim 1, wherein the function estimates flashing of the fluid into the steam while passing through each of said chambers based on the following mass fraction being converted to vapor:

$$(H_{Li}-H_{Lo})/(H_{Vo}-H_{Lo}))*C,$$

where $H_{Li}$ is liquid enthalpy at pressure going in the choke, $H_{Lo}$ is liquid enthalpy at pressure out of the choke, $H_{Vo}$ is vapor enthalpy at pressure out of the choke and C is a scaling factor for amount of the steam that is released at each of said chambers.

9. The method according to claim 1, wherein the reservoir model uses an integrated wellbore hydraulics and reservoir model.

10. A method of improving steam assisted gravity drainage (SAGD) in a reservoir, comprising:
    predicting a differential pressure of a fluid that includes both water and steam through chambers separated by chokes of a well flow control device based on a Bernoulli equation using the following mass fraction to estimate the amount of steam that flashes in said chambers:

$$((H_{Li}-H_{Lo})/(H_{Vo}-H_{Lo}))*C,$$

where $H_{Li}$ is liquid enthalpy at pressure going in the choke, $H_{Lo}$ is liquid enthalpy at pressure out of the choke, $H_{Vo}$ is vapor enthalpy at pressure out of the choke and C is a scaling factor for amount of the steam that is released at said chambers stages;
    simulating hydrocarbon production using the differential pressure that is predicted; and
    optimizing a completion in a well based on said simulated hydrocarbon production, thereby improving SAGD in said reservoir.

11. The method according to claim 10, wherein the flow control device includes at least three chambers and the predicting uses a calculation through only two chambers.

12. A non-transitory computer-readable medium for simulating hydrocarbon production from a reservoir, comprising a non-transitory computer-readable medium storing instructions that, when executed by a processor, cause the processor to perform the following operations:
    a) retrieving a function for differential pressure through a well flow control device based on properties including flow rate, density, viscosity, steam quality, pressure and temperature of a fluid that includes both water and steam, wherein said well flow control device is modeled as a series of chokes separated by chambers, and pressure drop calculations are applied to said chokes and enthalpy steam flash calculations are applied to said chambers;
    b) transforming said function for differential pressure to an input parameter of a reservoir model of a reservoir;
    c) simulating hydrocarbon production using said reservoir model while accounting for both the flow control device and the reservoir; and d) displaying a simulated hydrocarbon production result on a user interface device.

13. The medium according to claim 12, wherein the transforming includes using the function for differential pressure to provide multiple different input parameters for multiple different reservoir models.

14. The medium according to claim 12, wherein the transforming of the function for differential pressure comprises generating one of i) an equation based on attributes different from the properties and ii) a curve that corresponds to behavior of the flow control device and is used for the input parameter of the reservoir model.

15. The medium according to claim 12, wherein the transforming of the function for differential pressure includes generating entries for a table that corresponds to behavior of the flow control device and said entries are used for the input parameter of the reservoir model.

16. The medium according to claim 12, wherein the function for differential pressure estimates the differential pressure using a Bernoulli equation scaled based on Reynolds number and the steam quality.

17. The medium according to claim 12, wherein the function for differential pressure estimates flashing of the fluid into the steam while passing through said chambers based on the following mass fraction being converted to vapor:

$$(H_{Li}-H_{Lo})/(H_{Vo}-H_{Lo}),$$

where $H_{Li}$ is liquid enthalpy at pressure going in the choke, $H_{Lo}$ is liquid enthalpy at pressure out of the choke and $H_{Vo}$ is vapor enthalpy at pressure out of the choke.

18. The medium according to claim 12, wherein the function estimates the differential pressure across more than two chambers based on a calculation through only two chambers using a Bernoulli equation and the following mass fraction being converted to vapor:

$$(H_{Li}-H_{Lo})/(H_{Vo}-H_{Lo}),$$

where $H_{Li}$ is liquid enthalpy at pressure going in the choke, $H_{Lo}$ is liquid enthalpy at pressure out of the choke and $H_{Vo}$ is vapor enthalpy at pressure out of the choke.

19. The medium according to claim 12, wherein the function for differential pressure estimates flashing of the fluid into the steam while passing through said chambers based on the following mass fraction being converted to vapor:

$$((H_{Li}-H_{Lo})/(H_{Vo}-H_{Lo}))*C,$$

where $H_{Li}$ is liquid enthalpy at pressure going in the choke, $H_{Lo}$ is liquid enthalpy at pressure out of the choke, $H_{Vo}$ is vapor enthalpy at pressure out of the choke and C is a scaling factor for an amount of the steam that is released at said chambers.

* * * * *